United States Patent [19]

Spaziante et al.

[11] 4,181,777

[45] Jan. 1, 1980

[54] RECHARGEABLE ZINC HALOGEN BATTERY

[75] Inventors: Placido M. Spaziante; Antonio Nidola, both of Lugano, Switzerland

[73] Assignee: Diamond Shamrock Technologies S.A., Geneva, Switzerland

[21] Appl. No.: 940,272

[22] Filed: Sep. 7, 1978

[51] Int. Cl.$^2$ ................ H01M 10/36; H01M 12/08
[52] U.S. Cl. ............................... 429/50; 204/55 R; 204/54 L; 429/105; 429/198
[58] Field of Search ............... 429/50, 51, 198, 105, 429/229; 204/54 R, 55 R, 54 L

[56] References Cited

U.S. PATENT DOCUMENTS

| | | | |
|---|---|---|---|
| 694,658 | 3/1902 | Meurant | 204/54 L |
| 1,491,381 | 4/1924 | Classen | 204/55 R |
| 1,851,219 | 8/1928 | Tainton | 204/55 R |
| 3,451,851 | 6/1969 | Stanimirovitch | 429/229 |
| 3,640,771 | 2/1972 | Zito | 429/105 |
| 3,713,888 | 1/1973 | Symons | 429/51 |

*Primary Examiner*—Donald L. Walton
*Attorney, Agent, or Firm*—Hammond & Littell

[57] ABSTRACT

A rechargeable zinc halogen battery has an aqueous electrolyte containing ions of zinc and halogen and an amount of polysaccharide and/or sorbitol sufficient to prevent zinc dendrite formation during recharging. The electrolyte may also contain trace amounts of metals such as tungsten, molybdenum and lead.

25 Claims, No Drawings

RECHARGEABLE ZINC HALOGEN BATTERY

STATE OF THE ART

Electrical energy storage systems utilize a halogen component for reduction at a normally positive elecrode and an oxidizable metal, usually zinc, adapted to become oxidized at a normally negative electrode during the normal discharge of the storage system. An aqueous electrolyte is employed for replenishing the supply of the halogen component as it becomes reduced at the positive electrode. The electrolyte contains the dissolved ions of the oxidized metal and the reduced halogen and is circulated between the electrode area and a storage area containing halogen hydrate which progressively decomposes during a normal discharge of the electrical energy storage system, liberating additional elemental halogen to be consumed at the positive electrode.

The electrochemical reaction that occurs in such a storage battery is represented by the following equations, which are representative of the situation in which the oxidizable metal is zinc and the halogen is chlorine.

$$Zn^o Zn^o \rightarrow Zn^{++} + 2e$$

$$Cl_2{}^o + 2e \rightarrow 2Cl^-$$

As will be noted from the foregoing equations, the progressive oxidation of the zinc is to a zinc ion which becomes dissolved in the electrolyte and a corresponding reduction of elemental chlorine is to a chloride ion which also becomes dissolved in the electrolyte.

During the recharging cycle, a reversal of the chemical reaction is effected whereby the oxidized zinc present in the form of a dissolved ion in the electrolyte is reduced at the normally negative electrode and deposits or plates out while the halide ion becomes oxidized at the normally positive electrode, returning to the elemental state in the form of dissolved or minute gas bubbles in the electrolyte. The halogen gas thus formed is continuously removed from the cell and is stored in an appropriate manner such as the halogen hydrate, as described in U.S. Pat. No. 3,713,888.

Electrical energy storage systems or secondary batteries of this type are categorized as being of the so-called high energy density (H.E.D.) type since they are capable of supplying upwards of 50 watt hours of electric power per pound of weight. The high energy capacity and compactness of such H.E.D. batteries renders them particularly satisfactory for use as principal or auxiliary sources of electrical energy in both mobile and stationary power plant systems. Metal-halogen secondary storage batteries of the foregoing type are described in detail in U.S. Pat. No. 3,713,888.

Among the advantages of secondary storage batteries of the metal halogen type is the ability to be recharged quickly and efficiently whereby they are again restored to full-charged capacity. In a rechargeable secondary storage battery, the halogen constituent may be replenished by withdrawing a proportion of the aqueous electrolyte and substituting therefor a halogen hydrate which, upon decomposition during normal discharge, liberates elemental halogen and water, whereby the concentration of the metal halide in the electrolyte remains substantially constant during the discharge cycle. The halogen hydrate comprises a compact and extremely convenient method of storing and replenishing the halogen component in the storage system.

To charge a rechargeable storage battery, a reverse electrical current is applied, whereby the halide is oxidized to the elemental halogen which is recovered as a gas and is re-converted in the presence of water in the corresponding halogen hydrate storage area within the sytem. In either event, the formation of the halogen hydrate is accomplished under controlled temperature conditions, whereby halogen and water are combined to produce a corresponding solid hydrate. This operation can be performed within the system itself or by a central hydrate processing unit disposed remote from the electrical energy storage system.

Problems with zinc electrodes are caused by the redeposition of zinc on the electrodes during the charging process during which the zinc to a large extent forms zinc dendrites which have a tendency to grow towards the counter electrodes and cause a short circit in the cell.

Different methods have been tried to solve this problem. The use of a semi-permeable membrane between the zinc electrode and the counter electrode has become very common. The membranes are so dense that the growing of zinc dendrites is made difficult. A large number of additives of different kinds, organic as well as inorganic substances have been tried in the electrolytes of zinc-alkaline batteries. These endeavours have led to improvements of the zinc-alkaline batteries without any of the known additives being in any way satisfactory for zinc-halogen batteries.

OBJECTS OF THE INVENTION

It is an object of the invention to provide a novel zinc halogen rechargeable battery which can be recharged without zinc dendrite formation.

It is another object of the invention to provide a novel improved electrolyte for zinc halogen batteries.

It is a further object of the invention to provide a novel method of avoiding zinc dendrite formation in zinc halogen batteries by adding a polysaccharide and/or sorbitol to the aqueous electrolyte.

These and other objects and advantages of the invention will becomes obvious from the following detailed description.

THE INVENTION

The novel rechargeable zinc halogen battery of the invention is comprised of a cell having a normally positive electrode for reducing a halogen disposed in electrical contact therewith and a normally negative electrode for oxidizing zinc disposed in electrical contact therewith during electrical discharge of the battery and an aqueous electrolyte containing ions of zinc and halogen and an amount of at least one member of the group consisting of a polysaccharide andsorbitol sufficient to prevent zinc dendrite formation during electrical charge of the battery.

Preferably, the electrolyte is an aqueous solution which may contain as little as 0.1% by weight up to a saturated concentration of the zinc halide, preferably the chloride or bromide. It is preferred that the zinc halide be present in concentrations of at least about 5% to about 50% and more usually in concentrations from about 10 up to about 35% by weight. In those instances in which zinc chlordie is utilized as the metal halide, a maximum conductivity of the electrolyte is obtained when a concentration of about 25% by weight of zinc chloride is present. Accordingly, when zinc chloride is the metal halide in an aqueous electrolyte, concentrations ranging from about 10 to about 35% by weight have been found particularly satisfactory.

The polysaccharides used in the invention are those that are insoluble and form the skeletal structure of plants. The preferred polysaccharide of the invention is agar which is a dried mucilaginous extract obtained from various species of seaweed such as Japan agar. A molecule of agar from Gelidium cartilaginium may be represented as a chain of alternating D-galactose residues and 3,6-anhydro-1-galactose residues, with a half-ester sulfate on about every 10th galactose unit; O'Neill, Stewart, Can. J. Chem. 34, 1700 (1956).

Polysaccharides and sorbitol have the advantage that when added to zinc halogen electrolytes they are not degraded during the recharging and discharging cycles and the zinc deposits formed during charging are excellent and at very good faraday efficiencies. The amount of polysaccharides and/or sorbitol in the electrolyte is preferably 50 to 2000 ppm depending upon the amount of zinc present in the electrolyte. More perferably, the amount of polysaccharide and/or sorbitol is 500 to 1000 ppm. Moreover, zinc dendrite and pitting is avoided in the zinc deposits formed during the charging and thicker deposits of zinc, i.e. of the order of 0.35 to 0.45 mm thick, may be obtained.

In a preferred embodiment of the invention, it has been found advantageous to add to the electrolyte 1 to 50 ppm of an ion of at least one metal selected from the group consisting of lead molybdenum, tungsten, chromium, vanadium, cadmium, copper, germanium, arsenic, antimony, bismuth, selenium and tellurium in addition to the polysaccharide and/or sorbitol.

While sorbitol and the polysaccharide result in very smooth zinc deposits free of dendrite formation, the zince deposits are sometimes less reactive resulting in a penalty during the discharge operation. It has been found that the addition of the said metal ions improves the discharge characteristics of the battery probably because the grain size of the zinc deposit is decreased. The preferred metals are molybdenum, lead and tungsten.

The said metal ions can be added to the electrolyte in the form of any electrolyte soluble salt of the metal but the preferred salt is the sodium salt so as not to introduce any additional ions into the electrolyte.

The novel electrolyte of the invention is comprised of 0.1 g/liter up to saturation of a zinc halide salt in an aqueous solution and a sufficient amount of a polysaccharide and/or sorbitol to prevent dendrite formation. The amount of polysaccharide and/or sorbitol is 50 to 2000 ppm and the electrolyte may contain other additives to increase the concentration of the zinc and halide ions in the electrolyte such as zinc sulfate and sodium chloride. As mentioned above, the novel electrolyte also preferably contains 1 to 50 ppm of an ion of at least one metal selected from the group consisting of lead, molybdenum, tungsten, chromium, vanadium, cadmium, copper, germanium, aersenic, antimony, bismuth, selenium and tellurium in addition to the polysaccharide and/or sorbitol.

Tests have shown that other organic additives such as glycerol, phenol, resorcinol, mannitol, napthol, pyrocatheol and hydroxyacetic acid have no favorable effect on dendrite formation. Other additives may be added to the electrolyte to obtain additional effects.

In the following examples there are described several preferred embodiments to illustrate the invention. However, it should be understood that the invention is not intended to be limited to the specific embodiements.

EXAMPLE 1

A cell provided with a normally positive electrode of a titanium substrate provided with a coating of a $RuO_2$-$TiO_2$ mixed crystal material (25 to 50 cm$^2$) and a normally negative electrode of cleaned commercially pure titanium (25 to 50 cm$^2$) with an electrode gap of 3 mm and a solution flow rate of 1.2 liters per minute was used for the test. The electrolyte in the cell was an aqueous solution of 400 g/liter of zinc chloride, 50 g/liter of zinc sulfate and 100 g/liter of sodium chloride at 20° C. and an electric current with a current density of 0.5 KA/m$^2$ was applied thereto. The electrolyte also contained varying amounts of agar and the morphology of the zinc deposit and the faraday efficiency of the zinc deposit were determined. The results are reported in Table I.

TABLE I

| Additive | Amount in ppm | Zinc morphology thickness μ | dendrites | pittings | % Faraday efficiency |
|---|---|---|---|---|---|
| — | 0 | 190 | many | many | ≧ 95 |
| Agar$^{(x)}$ | 1 | 200 | many | nil | ≧ 95 |
|  | 100 | 190 | a few | nil | ≧ 95 |
|  | 500 | 210 | nil | nil | ≧ 95 |
|  | 1000 | 200 | nil | nil | ≧ 95 |
|  | 2000 | 180 | nil | nil | ≧ 95 |

$^{(x)}$Purified Agar-Agar as marketed by Mercks Co.

As can be seen from Table I, the addition of as little as 100 ppm of agar resulted in improved results in the absence of pitting in the zinc deposit and lack of dendrite formation. There was a sharp improvement in the zinc morphology with excellent faraday efficiency.

EXAMPLE 2

Using the test cell and procedure of Example 1, 500 and 1000 ppm of agar were added to the electrolyte and the electric current was impressed on the cell to determine the maximum acceptable zinc thickness which was about 350 μ or 0.35 mm since above that thickness, dendrite formation occurred. The results are reported in Table II.

TABLE II

| Amount of agar in ppm | Zinc morphology thickness (μ) | dendrite | pittings | zinc deposition efficiency % |
|---|---|---|---|---|
| 500 | 210 | nil | nil | ≧ 95 |
|  | 250 | nil | nil |  |
|  | 310 | nil | nil |  |
|  | 380 | slight increase | nil |  |
|  | 430 | a few | nil |  |
| 1000 | 200 | nil | nil | ≧ 95 |
|  | 240 | nil | nil |  |
|  | 290 | nil | nil |  |
|  | 340 | nil | nil |  |
|  | 410 | a few | nil |  |
|  | 450 | a few | nil |  |

EXAMPLE 3

Using the test cell and procedure of Example 1, 500 and 1000 ppm of agar were added to the electrolyte and an electric current of variable density was impressed on the cell to determine the maximum acceptable current density to obtain a satisfactory zinc deposit. The results of Table III show that under these conditions the maximum current density was somewhere between 0.6 and 0.7 KA/m².

TABLE III

| Amount of agar in ppm | current density KA/m² | zinc morphology thickness (μ) | dendrite | pittings | Zinc Deposition faraday efficiency % |
|---|---|---|---|---|---|
| 500 | 0.5 | 210 | nil | nil | ≧95 |
|  | 0.6 | 200 | nil | nil | ≧95 |
|  | 0.7 | 210 | a few | nil | ≧95 |
|  | 0.8 | 200 | a few | nil | ≧95 |
|  | 0.9 | 210 | many | nil | ≧95 |
|  | 1.00 | 200 | many | nil | ≧95 |
| 1000 | 0.5 | 200 | nil | nil | ≧95 |
|  | 0.6 | 210 | nil | nil | ≧95 |
|  | 0.7 | 190 | slight increase | nil | ≧95 |
|  | 0.8 | 210 | a few | nil | ≧95 |
|  | 0.9 | 200 | a few | nil | ≧95 |
|  | 1.0 | 210 | a few | nil | ≧95 |

EXAMPLE 4

Using the procedure and test cells of Example 3, 500 and 1000 ppm of sorbitol were added to the electrolyte and an electrical current of variable density was impressed on the cell to determine the maximum acceptable current density to obtain a satisfactory zinc deposit. The results are reported in Table IV and the maximum acceptable current density in both cases was 0.7 Ka/m².

TABLE IV

| Amount of Soribitol (ppm) | Current density (kA/m²) | Zinc morphology thickness (μ) | Dendrites | Pittings | Zinc deposition faraday efficiency (%) |
|---|---|---|---|---|---|
| 500 | 0.6 | 160 | slight | Nil | ≧95 |
|  | 0.7 | 210 | slight | Nil |  |
|  | 0.8 | 190 | a few | Nil |  |
|  | 0.9 | 170 | many | Nil |  |
|  | 1.0 | 190 | many | Nil |  |
| 1000 | 0.6 | 190 | slight | Nil | ≧95 |
|  | 0.7 | 190 | slight | Nil |  |
|  | 0.8 | 200 | a few | Nil |  |
|  | 0.9 | 180 | many | Nil |  |
|  | 1.0 | 170 | many | Nil |  |

EXAMPLE 5

The test procedure of Example 2 was repeated with additions of 500 and 1000 ppm of sorbitol to the electrolyte and the maximum acceptable zinc thickness was determined to be 390μ in both cases at 0.6 KA/m². The results are reported in Table V.

TABLE V

| Amount of Sorbitol (ppm) | Zinc morphology Thickness (μ) | dendrites | pittings | Zinc deposition faraday efficiency (%) |
|---|---|---|---|---|
| 500 | 160 | slight | Nil | ≧95 |
|  | 210 | slight | Nil |  |
|  | 280 | slight | Nil |  |
|  | 350 | slight | Nil |  |
|  | 390 | slight increase | Nil |  |
|  | 450 | slight increase | Nil |  |
|  | 480 | a few | slight increase |  |
| 1000 | 190 | slight | Nil | ≧95 |
|  | 290 | slight | Nil |  |
|  | 330 | slight | Nil |  |
|  | 370 | slight | Nil |  |
|  | 430 | slight increase | Nil |  |
|  | 490 | a few | slight increase |  |

EXAMPLE 6

A test battery was equipped with a bare titanium cathode and a porous titanium plate anode provided with an electrolytic coating of ruthenium dioxide and titanium dioxide with an interelectrodic gap of 3 to 4 mm and an electrode area of 72 cm². The electrolyte consisted of 250 g/l of zinc chloride, 50 g/l of $ZnSO_4.7H_2O$, 250 g/l of sodium chloride 55 g/l of $AlCl_3.6H_2O$ and 25 g/l of sodium acetate trihydrate and the battery went through a series of charging and discharging at a current density of 500 or 400 A/cm². The current efficiency ($\eta I$), the voltage efficiency ($\eta V$), specific capacity and specific energy storage were determined in each case. The operating data and condition of the zinc deposit were determined with and without additives and the results are reported as follows:

(1) After 20 cycles without Additives

| current density | 500 A/cm² | 400 A/cm² |
|---|---|---|
| specific capacity | ~100 A/h/cm² | ~120 A/h/cm² |
| specific energy storage | ~230 W/h/cm² | ~280 W/h/cm² |
| $\eta I$ (charge) | ~85 ÷ 90% |  |
| $\eta I$ (discharge) | ~80 ÷ 85% |  |
| $\eta I$ (overall) | ~70 ÷ 75% | ~73 ÷ 76% |
| $\eta V$ | ~77 ÷ 85% | ~80 ÷ 86%, |
| Aspect of deposit:dendritic |  |  |

(2) After 10 cycles with addition of 100 ppm of Agar

| current density | 500 A/cm² |
|---|---|
| specific capacity | ~100 A/h/cm² |
| specific energy storage | ~230 W/h/cm² |
| $\eta I$ (charge) | ~85 ÷ 90% |
| $\eta I$ (discharge) | ~75 ÷ 80% |
| $\eta I$ (overall) | ~65 ÷ 70% |
| $\eta V$ | ~65 ÷ 75% |
| Aspect of deposit:exceptionally smooth |  |

(3) After 4 cycles with the addition of 10 ppm as Mo of $Na_2MoO_4.2H_2O$

| current density | 500 A/cm² |
|---|---|
| specific capacity | ~100 A/h/cm² |
| specific energy storage | ~230 W/h/cm² |
| $\eta I$ (charge) | ~95% |
| $\eta I$ (discharge) | ~86% |
| $\eta I$ (overall) | ~82% |
| $\eta V$ | ~82% |

-continued

Aspect of deposit: dendritic (4) After 10 cycles with the addition of 10 ppm as Mo of Na$_2$MoO$_4$.2H$_2$O and 100 ppm of Agar

| current density | 500 A/cm$^2$ |
| --- | --- |
| specific capacity | ~100 A/h/cm$^2$ |
| specific energy storage | ~230 W/h/cm$^2$ |
| ηI (charge) | ~80 ÷ 92% |
| ηI (discharge) | ~88 ÷ 94% |
| ηI (overall) | ~78 ÷ 84% |
| ηV | ~80% |
| Aspect of deposit: free from dendrites | |

(5) After 20 cycles with the addition of 500 ppm of Sorbitol, 50 ppm of Agar and 10 ppm as Mo of Na$_2$MoO$_4$.2H$_2$O

| current density | 500 A/cm$^2$ | 400 A/cm$^2$ |
| --- | --- | --- |
| specific capacity | ~120 A/h/cm$^2$ | ~140 A/h/cm$^2$ |
| specific energy storage | ~280 W/h/cm$^2$ | ~320 W/h/cm$^2$ |
| ηI (charge) | 89 ÷ 93% | 89 ÷ 93% |
| ηI (discharge) | 87 ÷ 90% | 87 ÷ 90% |
| ηI (overall) | 80 ÷ 81% | 80 ÷ 81% |
| ηV | 75 ÷ 77% | 78 ÷ 80% |
| Aspect of deposit: free from dendrites | | |

These results clearly show that the addition of sorbitol and/or agar-agar effectively prevents dendrite formation. Reduction of the current efficiency during discharge produced by the addition of agar alone is countered by the further addition of trace quantities of a selected metal additive, in these examples molybdenum ions, without reducing the dendrite inhibiting effect of the agar.

EXAMPLE 7

A battery was equipped with a bare titanium cathode plate and a porous titanium plate provided with an electrocatalytic coating of ruthenium dioxide with an interelectrodic gap of 3.5 mm and an electrode area of 72 cm$^2$. The electrolyte consisted of 250 g/l of sodium chloride, 250 g/l of ZnCl$_2$, 50 g/l of ZnSO$_4$.7H$_2$O, 55 g/l of AlCl$_3$.6H$_2$O and 25 g/l of CH$_3$COONa.3H$_2$O and had a pH of ~3. The battery was put through a series of charging and discharging cycles at a current density of 500 or 400 A/cm$^2$ and the current efficiency, voltage efficiency, specific capacity and specific energy storage were determined with the following additives as well as the condition of the zinc deposit. The results are reported as follows.

(A) 10 cycles with the addition of 10 ppm of WO$_3^-$ and 100 ppm of agar

| current density | 500 A/cm$^2$ |
| --- | --- |
| specific capacity | 100 A/h/cm$^2$ |
| specific energy storage | 230 W/h/cm$^2$ |
| ηI (charge) | 87-90% |
| ηI (discharge) | 89 ÷ 93% |
| ηI (overall) | 77 ÷ 85% |
| ηV | 78 |
| Aspect of deposit: free of dendrites | |

(B) After 20 cycles with addition of 500 ppm of sorbitol, 50 ppm of agar and 10 ppm of lead ions

| current density | 400 A/cm$^2$ |
| --- | --- |
| specific capacity | 140 A/h/cm$^2$ |
| specific energy storage | 320 W/h/cm$^2$ |
| ηI (charge) | 88 ÷ 93% |
| ηI (discharge) | 86 ÷ 91% |
| ηI (overall) | 80 ÷ 81% |
| ηV | 78 ÷ 80% |
| Aspect of deposit: free from dendrites | |

In the latter example, the full cycle energy efficiency was computed and was between 60 and 63%.

Various modifications of the cell and electrolyte and method of the invention may be made without departing from the spirit or scope thereof and it is to be understood that the invention is intended to be limited only as defined in the appended claims.

We claim:

1. An improved rechargeable zinc halogen battery comprising a cell having a normally positive electrode for reducing a halogen disposed in electrical contact therewith and a normally negative electrode for oxidizing zinc disposed in electrical contact therewith during electrical discharge of the battery and an aqueous electrolyte containing ions of zinc and halogen and containing 1 to 50 ppm of an ion of at least one metal selected from the group consisting of lead, molybdenum, tungsten, chromium, vanadium, cadmium, copper, germanium, arsenic, antimony, bismuth, selenium and tellurium and an amount of at least one additive of the group consisting of a polysaccharide and sorbitol sufficient to prevent zinc dendrite formation during electrical charge of the battery.

2. The battery of claim 1 wherein the halogen is chlorine.

3. The battery of claim 1 wherein the additive is a polysaccharide.

4. The battery of claim 3 wherein the polysaccharide is agar-agar.

5. The battery of claim 1 wherein the amount of polysaccharide is 500 to 1000 ppm.

6. The battery of claim 1 wherein the additive is sorbitol.

7. The battery of claim 6 wherein the amount of sorbitol is 500 to 1000 ppm.

8. The battery of claim 1 wherein the electrolyte contains a mixture of a polysaccharide and sorbitol.

9. The battery of claim 1 wherein the metal is selected from the group consisting of tungsten, molybdenum and lead.

10. An electrolyte for a rechargeable zinc halogen battery comprising an aqueous solution of zinc and halogen ions containing 50 to 2000 ppm of at least one additive selected from the group consisting of a polysaccharide and sorbitol and containing 1 to 50 ppm of an ion of at least one metal selected from the group consisting of lead, molybdenum, tungsten, chromium, vanadium, cadmium, copper, germanium, arsenic, antimony, bismuth, selenium and tellurium.

11. The electrolyte of claim 10 wherein the halogen is chlorine.

12. The electrolyte of claim 10 wherein the additive is a polysaccharide.

13. The electrolyte of claim 12 wherein the polysaccharide is agar.

14. The electrolyte of claim 13 wherein the amount of agar is 500 to 1000 ppm.

15. The electrolyte of claim 10 wherein the additive is sorbitol.

16. The electrolyte of claim 10 wherein the additive is a mixture of a polysaccharide and sorbitol.

17. The electrolyte of claim 10 wherein the metal is selected from the group consisting of tungsten, molybdenum, and lead.

18. In a method of operating a rechargeable zinc halogen battery, the improvement comprising adding to the aqueous electrolyte a sufficient amount of at least one additive selected from the group consisting of polysaccharide and sorbitol to prevent zinc dendrite formation during the charging cycle and 1 to 50 ppm of an ion of at least one metal selected from the group consisting of lead, molybdenum, tungsten, chromium, vanadium, cadmium, copper, germanium, arsenic, antimony, bismuth, selenium, tellurium.

19. The method of claim 18 wherein the halogen is chlorine.

20. The method of claim 18 wherein the additive is a polysaccharide.

21. The method of claim 18 wherein the polysaccharide is agar.

22. The method of claim 18 wherein the amount of agar is 500 to 1000 ppm.

23. The method of claim 18 wherein the additive is sorbitol.

24. The method of claim 18 wherein the additive is a mixture of a polysaccharide and sorbitol.

25. The method of claim 18 wherein the metal is selected from the group consisting of tungsten, molybdenum and lead.

* * * * *